(12) United States Patent
Martin

(10) Patent No.: US 7,248,685 B2
(45) Date of Patent: Jul. 24, 2007

(54) THREE-WAY CALL DETECTION USING STEGANOGRAPHY

(75) Inventor: Thomas J. Martin, State College, PA (US)

(73) Assignee: Inmate Telephone, Inc., Altoona, PA (US)

(*) Notice: Subject to any disclaimer, the term of this patent is extended or adjusted under 35 U.S.C. 154(b) by 72 days.

(21) Appl. No.: 10/910,566

(22) Filed: Aug. 4, 2004

(65) Prior Publication Data

US 2005/0058267 A1 Mar. 17, 2005

Related U.S. Application Data

(60) Provisional application No. 60/492,288, filed on Aug. 5, 2003.

(51) Int. Cl.
H04M 3/42 (2006.01)
H00B 1/00 (2006.01)

(52) U.S. Cl. ............... 379/207.01; 375/130; 375/146; 375/147

(58) Field of Classification Search ............ 375/130, 375/140, 146, 147; 379/202.01, 207.01, 379/88.19, 88.2
See application file for complete search history.

(56) References Cited

U.S. PATENT DOCUMENTS

| 4,670,628 | A | 6/1987 | Boratgis et al. |
| 4,691,347 | A | 9/1987 | Stanley et al. |
| 4,737,982 | A | 4/1988 | Boratgis et al. |
| 4,813,070 | A | 3/1989 | Humphreys et al. |
| 4,907,221 | A | 3/1990 | Pariani et al. |

(Continued)

FOREIGN PATENT DOCUMENTS

| GB | 2 075 313 | 11/1981 |
| JP | 59225626 | 12/1984 |
| JP | 60010821 | 1/1985 |

(Continued)

OTHER PUBLICATIONS

Coherent Announces Industry's First Remote Management System for Echo Cancellers, Business Wire, Mar. 3, 1997.

(Continued)

*Primary Examiner*—Bing Q. Bui
(74) *Attorney, Agent, or Firm*—Wiley Rein LLP

(57) ABSTRACT

Three-way call detection is an important component of correctional facility telephone equipment because it helps restrict calling access by certain persons to certain restricted telephone numbers. Various three-way call detection methods exist, but all of these implementations suffer from one major limitation-the detection accuracy is not as high as is desired by the industry. The present invention improves detection accuracy, using "steganography." Steganography involves hiding one set of data or signals within another signal or carrier in such a way that its presence is typically imperceptible to the human ear, and potential even the originator of the carrier signal. The present invention involves a device that connects to a telephone, either at the line or the handset interfaces, and produces a known signal that is steganographically hidden within the user's normal voice signal. Detection equipment, residing at another location, monitors signals on telephone calls and tests for the presence of the hidden signal or data generated by the invention. Once detection is achieved, appropriate action, such as terminating or recording the call, may be taken. Improved accuracy is achieved by choosing the appropriate hidden signal(s). Once detected, the presence of the signal guarantees the call was made to the restricted party from a particular phone line.

42 Claims, 8 Drawing Sheets

Simplified Invention Block Diagram

U.S. PATENT DOCUMENTS

| | | |
|---|---|---|
| 4,918,719 A | 4/1990 | Daudelin |
| 4,995,030 A | 2/1991 | Helf |
| 5,291,548 A | 3/1994 | Tsumura et al. |
| 5,319,702 A | 6/1994 | Kitchin et al. |
| 5,319,735 A | 6/1994 | Preuss et al. |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,502,762 A | 3/1996 | Andrew et al. |
| 5,535,194 A | 7/1996 | Ashley et al. |
| 5,535,261 A | 7/1996 | Brown et al. |
| 5,539,731 A | 7/1996 | Haneda et al. |
| 5,539,812 A * | 7/1996 | Kitchin et al. ............... 379/189 |
| 5,555,551 A | 9/1996 | Rudokas et al. |
| 5,590,171 A | 12/1996 | Howe |
| 5,592,548 A | 1/1997 | Sih |
| 5,613,004 A | 3/1997 | Cooperman |
| 5,636,292 A | 6/1997 | Rhoads |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,426 A | 6/1998 | Rhoads |
| 5,774,452 A | 6/1998 | Greenberg |
| 5,796,811 A | 8/1998 | McFarlen |
| 5,805,685 A | 9/1998 | McFarlen |
| 5,822,432 A | 10/1998 | Moskowitz |
| 5,822,436 A | 10/1998 | Rhoads |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,862,260 A | 1/1999 | Rhoads |
| 5,867,562 A | 2/1999 | Scherer |
| 5,883,945 A | 3/1999 | Richardson, Jr. et al. |
| 5,889,868 A | 3/1999 | Seraphim et al. |
| 5,907,602 A | 5/1999 | Peel et al. |
| 5,920,834 A | 7/1999 | Sih et al. |
| 5,926,533 A | 7/1999 | Gainsboro |
| 5,930,369 A | 7/1999 | Cox et al. |
| 5,930,377 A | 7/1999 | Powell et al. |
| 5,963,909 A | 10/1999 | Warren et al. |
| 5,982,891 A | 11/1999 | Ginter et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,052,462 A | 4/2000 | Lu |
| 6,072,860 A | 6/2000 | Kek et al. |
| 6,078,567 A | 6/2000 | Traill et al. |
| 6,078,645 A | 6/2000 | Cai et al. |
| 6,111,954 A | 8/2000 | Rhoads |
| 6,122,392 A | 9/2000 | Rhoads |
| 6,122,403 A | 9/2000 | Rhoads |
| 6,138,119 A | 10/2000 | Hall et al. |
| 6,185,416 B1 | 2/2001 | Rudokas et al. |
| 6,185,683 B1 | 2/2001 | Ginter |
| 6,205,249 B1 | 3/2001 | Moskowitz et al. |
| 6,233,347 B1 | 5/2001 | Chen |
| 6,237,786 B1 | 5/2001 | Ginter et al. |
| 6,243,480 B1 | 6/2001 | Zhao et al. |
| 6,253,193 B1 | 6/2001 | Ginter et al. |
| 6,266,430 B1 | 7/2001 | Rhoads |
| 6,278,781 B1 | 8/2001 | Rhoads |
| 6,289,108 B1 | 9/2001 | Rhoads |
| 6,301,360 B1 | 10/2001 | Bocionek et al. |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |

FOREIGN PATENT DOCUMENTS

| | | |
|---|---|---|
| JP | 61135239 | 6/1986 |
| JP | 3065826 | 3/1991 |
| WO | PCT/US9514230 | 5/1996 |

OTHER PUBLICATIONS

Frankel, Elana; Audioconferencing options. (Teleconference Units, Conference Bridges and Service Bureaus) (includes related articles on speech processing and new conferencing technology); Teleconnect, v 14, n.5., p. 131(3), May 1996.

Silberg, Lurie; Digital on Call, HFN The Weekly Newspaper for the Home Furnishing Network, p. 97, Mar. 17, 1997.

Qwest; Inmate Telephone Services: Large Business: Voice; Oct. 2, 2001.

Cox, Ingemar J., et al.; Secure Spread Spectrum Watermarking for Multimedia, NEC Research Institute, Technical Report 95-10.

Boney, Laurence, et al.; Digital Watermarks for Audio Signals; Proceedings of the International Conference on Multimedia Computing Systems; 1996; p. 473-480.

Boney, Laurence, et al.; Digital Watermarks for Audio Signals; Proceedings of EUSIPCO-96, Eighth European Signal processing Conference, Trieste, Italy, Sep. 10-13, 1996.

Tirkel, Anatol, et al.; Image Watermarking—A Spread Spectrum Application.

Bender, W., et al.; Techniques For Data Hiding; IBM Systems Journal, vol. 35, Nos. 3&4, 1996.

Newton's Telecom Dictionary, 18th Edition, Feb. 2002, pp. 168, Section "Coding Theory".

* cited by examiner

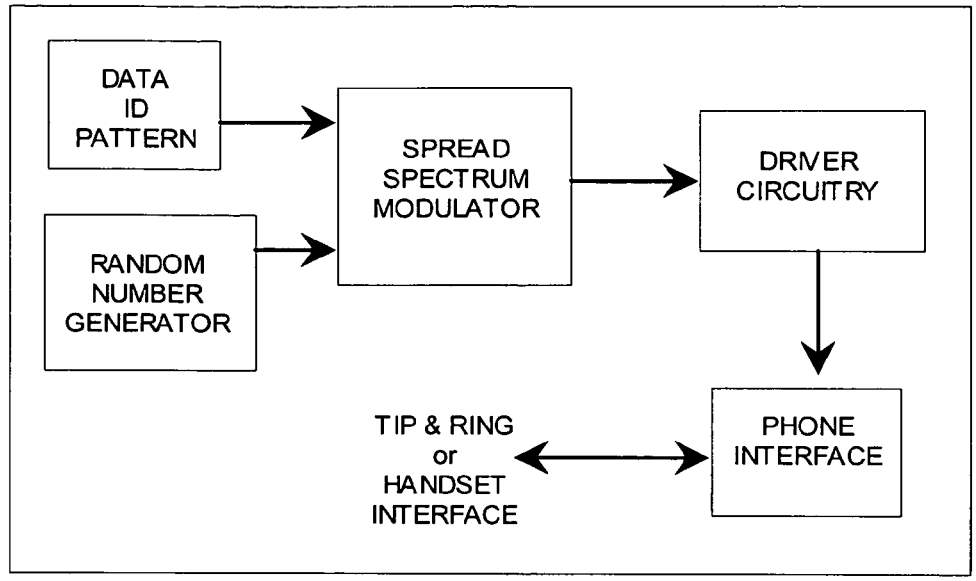
FIGURE 1 - Simplified Invention Block Diagram
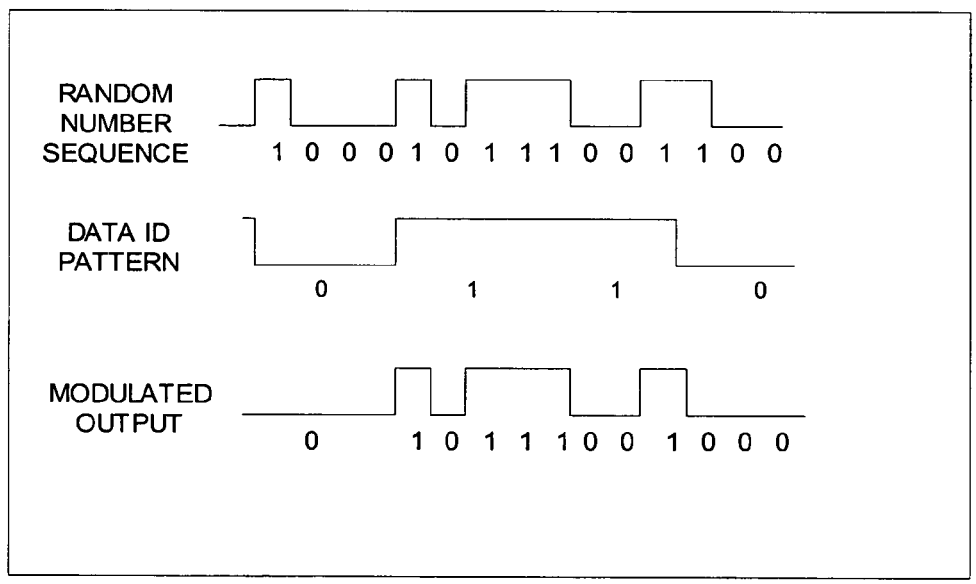
FIGURE 2 Typical BPSK Modulator Operation

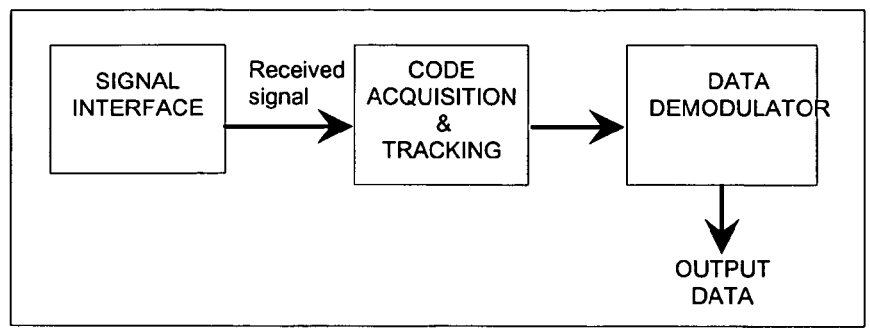
FIGURE 3 - Receiver Block Diagram
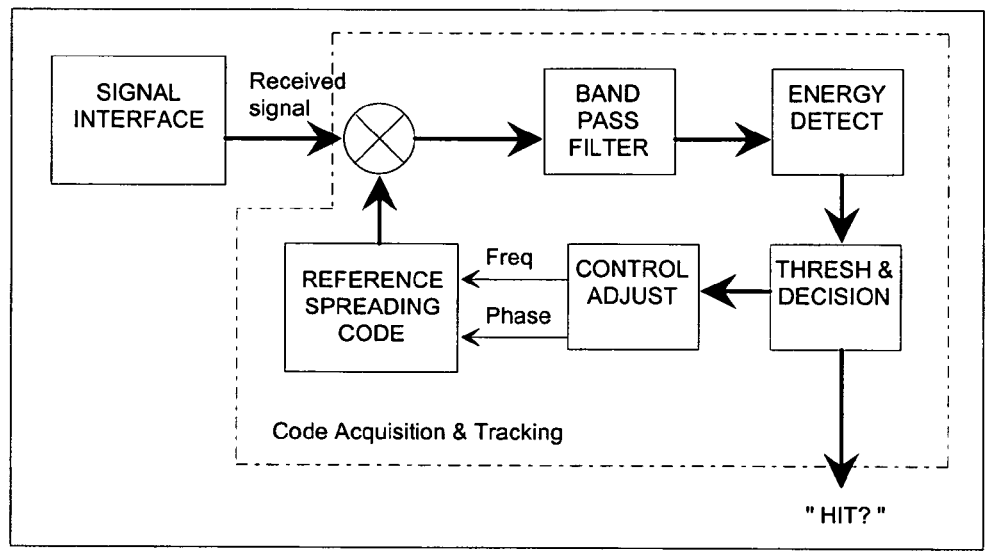
FIGURE 4 – Code Acquisition and Tracking Block Diagram

THREE-WAY CALL DETECTION USING STEGANOGRAPHY

RELATED APPLICATIONS

This application claims priority to U.S. Provisional Application No. 60/492,288, filed Aug. 5, 2003, the entire contents of which are hereby incorporated by reference.

FIELD OF THE INVENTION

This invention relates generally to telephony, and more particularly to a method and a system for detecting when a party has been added to a pre-existing telephone call.

BACKGROUND OF THE INVENTION

Modern phone companies offer a number of convenient services to their customers. One such service is called conference-calling, third-party calling or "three-way" calling. This allows an originating caller and a recipient caller, who establish a conversation, to engage the phone system to dial and connect a third party into the conversation as well.

Three-way calling is a convenient feature in many situations, but poses a problem in others. Inmates in correctional facilities have the ability to originate phone calls to others, but typically are not able to call those numbers on a given inmate's "restricted-number" list. Persons on the restricted list may include judges, prosecutors, other lawyers, victims of the inmate's crimes, or even other family members (especially in the case of protection-from-abuse (PFA) cases). By using three-way calling, inmates are able to contact people on these restricted lists. They first call a number not on the restricted list (a friend, for example), then have the friend perform a three-way call to the restricted number.

Although current prior art and patented devices attempt to solve the three-way call problem, they all suffer from one major limitation; namely, they are not 100% effective at detecting such calls. Inventions such as this are useful in correctional-institutes telephony markets, but some percentage of inmate calls (as much as 10%, 20%, or even 30%) which use three-way calling to get another party on the line, in violation of call-restriction rules, will get past the modern three-way call-detection system undetected and on to the intended party. Commercial pressures exist for the accuracy rates to be higher, and if possible, to be 100% to handle those calls that escape detection by present equipment and techniques.

SUMMARY OF THE INVENTION

Particular implementations of the present invention, which have yielded reliable and accurate three-way call detection systems and methods, will now be described. These present inventions use steganography to create efficiencies and improve the reliability of three-way call detection.

Disclosed herein is a three way call detection system for detecting the addition of a third party to an pre-existing telephonic connection between a first party and a second party, said system comprising an ID generator for generating identification data; a spread spectrum modulator for imposing the identification data onto a carrier signal, said modulator outputting a modulated identification signal having frequency components that are capable of being transmitted via a telephonic connection; a source telephone for participating in a telephone conversation; a signal combiner for adding the modulated identification signal to the telephone conversation to form an encoded telephone signal, the modulated identification signal being imperceptible to a human listener of the telephone conversation; a remote telephone for receiving the encoded telephone signal; and a spread spectrum demodulator for demodulating the modulated identification signal to extract the identification data. The identification data preferably is selected from the following: a personal identification number, a user number, an inmate identification number, a user name, data identifying the local telephone exchange of the source telephone, a telephone number of the source telephone, and data identifying the institution where the source telephone is located. The system further may comprise a processor for extracting the modulated identification signal from the encoded telephone signal. The spread spectrum modulator may impose the identification data onto a carrier signal by subdividing the identification data into a plurality of subdivisions and encoding the plurality of subdivisions on a plurality of frequency bands using a predetermined sequence. The spread spectrum demodulator optionally may demodulate the modulated identification signal, extract the plurality of subdivisions of the identification data and assemble the plurality of subdivisions of the identification data into the identification data using the predetermined sequence. The predetermined sequence preferably is a predetermined pseudo-random code. The system further may comprise a code generator for generating a pseudo-random code, and the predetermined sequence may be a pseudo-random code generated by the code generator. The signal combiner passively may add the pseudo-random code to the telephone conversation at a predetermined plurality of frequencies.

Also disclosed herein is a method for detecting the addition of a third party to an pre-existing telephonic connection between a first party and a second party, comprising generating identification data; subdividing the identification data into a plurality of subdivisions; encoding the plurality of subdivisions on a modulated identification signal, the modulated identification signal comprising the subdivisions of the identification data encoded on a plurality of frequency bands using the predetermined sequence; adding the modulated identification signal to a telephone signal to form an encoded telephone signal, the modulated identification signal being imperceptible to a human listener of the telephone signal; transmitting the encoded telephone signal across a telephonic connection; receiving the encoded telephone signal at a remote location; extracting the modulated identification signal from the encoded telephone signal; and demodulating the modulated identification signal to extract the plurality of subdivisions of the identification data; and assembling the plurality of subdivisions of the identification data to re-create the identification data using the predetermined sequence.

Also disclosed herein is a system for identifying a source telephone, said source telephone having identification data associated therewith, the system comprising a spread spectrum modulator for encoding the identification data into a spread spectrum signal using a spreading code; and a telephone interface for coupling to a telephone to add the spread spectrum signal to an output of the telephone. The system further may comprise a processor for coupling to a telephone to extract identification data using a spread spectrum demodulator and a spreading code. The spread spectrum modulator may be a selected one of a BPSK modulator, an MPSK modulator, and a QPSK modulator. The telephone interface may be coupled to a selected one of a telephone handset, a TIP/RING pair of a standard analog POTS line, and a digital telephone interface. The telephone interface preferably passively adds the spread spectrum signal to a telephone signal by a selected one of transformer coupling and capacitive coupling.

Also disclosed herein is a system for decoding a modulated identification signal imbedded in a telephone signal wherein the identification signal is capable of identifying a source of the identification signal, the system comprising a receiver for receiving a telephone signal, which telephone signal comprises an audio signal and a modulated identification signal, said modulated identification signal having identification data embedded therein; and a spread spectrum demodulator for demodulating the modulated identification signal to extract the identification data. The system further may comprise a processor, coupled to the receiver, for extracting the modulated identification signal from the telephone signal. The system further may comprise a comparator for comparing the identification data to a predetermined set of restricted data; and a restricted call response module for executing at least a selected one of the following responses if the identification data matches any of the predetermined set of restricted data: (1) turning off a microphone of a telephone, (2) disconnecting a telephone call, (3) recording any conversation that may occur on a call, (4) playing a prerecorded message, (5) recording call data, (6) disabling the speaker of a telephone, and (7) adding a disruptive signal to a telephonic connection. The system further may comprise a code generator for generating a pseudo-random code; a spread spectrum modulator for imposing the identification data onto a carrier signal using the pseudo-random code, said modulator outputting a modulated identification signal having frequency components that are capable of being transmitted via a telephonic connection; and a signal combiner for adding the modulated identification signal to an audio signal of a telephone microphone, said combiner producing a telephone signal as an output.

Also disclosed herein is a method for identifying a source telephone comprising providing a data identification pattern for identifying a source telephone; generating a reference spreading code using a random number generator; encoding the data identification pattern into an identification signal using the spreading code and a spread spectrum modulator, thereby generating a modulated identification signal; combining the modulated identification signal with an audio signal of a microphone output of a telephone to form a composite telephone signal, the modulated identification signal being imperceptible to a human listener of the composite telephone signal; and transmitting the composite telephone signal across a telephonic connection. The method further may comprise receiving the composite telephone signal from a source telephone at a remote location; multiplying the composite telephone signal by the reference spreading code to form a signal product; filtering or correlating the signal product to extract the modulated identification signal from the digital data; comparing the modulated identification signal with a predetermined set of restricted data signals to determine if the modulated identification signal matches at least one of a predetermined set of restricted data signals. The method further may comprise performing an envelope detection on the filtered signal product, if needed; and comparing the output of the envelope detection with a threshold value to determine if the signal product matches at least one of a predetermined set of restricted data signals. The method further may comprise initiating a restricted call response if the signal product matches at least one of a predetermined set of restricted data signals, the restricted call response being selected from the group of following choices: (1) turning off a microphone of a telephone, (2) disconnecting a telephone call, (3) recording a call, (4) playing a prerecorded message, (5) recording call data, (6) disabling the speaker of a telephone, and (7) adding a disruptive signal to a telephonic connection. The step of receiving the composite telephone signal further may comprise providing an analog-to-digital converter; and converting the composite telephone signal from an analog signal to a digital signal. The method further may comprise demodulating the modulated identification signal to extract the data identification pattern using a reference spreading code.

Also disclosed herein is a method for identifying a source of a telephone signal received by a remote telephone comprising receiving a composite telephone signal from a source telephone at a remote location, the composite telephone signal comprising an audio signal representative of a telephone conversation and a modulated identification signal, the modulated identification signal having identification data that was embedded therein using a reference spreading code; extracting the modulated identification signal; and analyzing the extracted modulated identification signal to determine if the identification signal contains data that matches at least one of a predetermined set of restricted data signals. The step of extracting the modulated identification signal further may comprise multiplying the composite telephone signal by the reference spreading code to form a signal product; and extracting the modulated identification signal. The method preferably comprises initiating a restricted call response if the signal product matches at least one of a predetermined set of restricted data signals, the restricted call response being selected from the group of following choices: (1) turning off a microphone of a telephone, (2) disconnecting a telephone call, (3) recording a call, (4) playing a prerecorded message, (5) recording call data, (6) disabling the speaker of a telephone, and (7) adding a disruptive signal to a telephonic connection. The step of receiving the composite telephone signal further may comprise providing an analog-to-digital converter; and converting the composite telephone signal from an analog signal to a digital signal. The method further may comprise demodulating the modulated identification signal to extract the identification data using a reference spreading code.

Also disclosed herein is a three way call detection system for detecting the addition of a third party having a third phone to an pre-existing telephonic connection between a first party having a first phone and a second party having a second phone comprising an ID generator for generating identification data; a spread spectrum modulator for imposing the identification data onto a carrier signal, said modulator outputting an identification signal having frequency components that are capable of being transmitted via a telephonic connection; a signal combiner for adding the identification signal to an output from a microphone of the first phone, thereby producing a combined output signal, said identification signal being added at a level that is imperceptible to a human ear that hears the combined output signal; a signal receiver coupled to a third phone, for receiving the combined output signal after transmission across a telephonic connection from the first phone to the third phone; a spread spectrum demodulator for demodulating the identification signal to extract the identification data; and a processor to analyze the identification data. The output from the microphone may comprise a digital signal and the signal combiner may comprise a selected one of a digital adder or a microcontroller that digitally adds the identification signal to the output from the microphone. The output from the microphone may comprise an analog signal and the signal combiner may comprise a transformer for coupling the identification signal to the output from the microphone. The system further may comprise a digital signal processor coupled to the signal receiver for extracting the identification signal from the combined output signal. The processor preferably analyzes the identification data to determine whether the connection is authorized. The third phone optionally is a component of a local telephone system, and the processor optionally analyzes the identification data and reports its analysis to the local telephone system. The combined output signal may travel a telephonic connection between the first phone to the second phone, and travels a telephonic connection between the second phone and the third phone.

Also disclosed herein is a detection system for detecting a telephonic connection between a first phone and a second phone comprising an ID generator for generating identification data; a spread spectrum modulator for imposing the identification data onto a carrier signal, said modulator outputting an identification signal having frequency components that are capable of being transmitted via a telephonic connection; a signal combiner for adding the identification signal to an output from a microphone of a first phone, thereby producing a combined output signal, said identification signal being added at a level that is imperceptible to a human ear that hears the combined output signal; a signal receiver for receiving the combined output signal after transmission across a telephonic connection; a spread spectrum demodulator for demodulating the identification signal to extract the identification data; and a processor to analyze the identification data. The system further may comprise a digital signal processor coupled to the signal receiver for extracting the identification signal from the combined output signal. The first phone may be a restricted phone, and the processor may determine whether the connection between the restricted phone and the second phone is unauthorized. The processor may be coupled to the second phone, and upon the detection of an unauthorized connection, the processor may cause one or more of the following actions to occur: a) recording a conversation between the restricted phone and the second phone; b) terminating the connection between the restricted phone and the second phone; c) disabling a speaker of the second phone; d) adding an audible disruptive signal to the telephonic connection; and e) adding an audible warning message to the telephonic connection. The second phone may be a restricted phone, and the processor may determine whether the connection between the first phone and the restricted phone is unauthorized. The processor may be coupled to the second phone, and upon the detection of an unauthorized connection, the processor may cause one or more of the following actions to occur: a) recording a conversation between the restricted phone and the second phone; b) terminating the connection between the restricted phone and the second phone; c) turning off a microphone of the restricted phone; d) adding an audible disruptive signal to the telephonic connection; and e) adding an audible warning message to the telephonic connection. The signal receiver may be coupled to a third phone that is a component of a local telephone system, and the processor may analyze the identification data and report its analysis to the local telephone system.

The present invention overcomes the problems and disadvantages associated with conventional systems and methods, and provides improved systems and methods whereby the additions of new parties to a telephone call may be detected.

Other embodiments and advantages of the invention are set forth in part in the description that follows, and in part, will be obvious from this description, or may be learned from the practice of the invention.

BRIEF DESCRIPTION OF THE DRAWINGS

FIG. 1 represents a block diagram of one embodiment of the transmitter portion of the present invention. FIG. 1 shows five distinct subsystems: the data ID pattern, the random number generator, the spread spectrum modulator, the drive circuitry, and the phone interface.

FIG. 2 illustrates the operation of a BPSK Modulator of one embodiment of the present invention.

FIG. 3 represents a block diagram of one embodiment of the receiver portion of the present invention. FIG. 3 shows three distinct subsystems: the signal interface, code acquisition & tracking, and the data demodulator.

FIG. 4 represents an expanded block diagram of the embodiment of FIG. 3 showing the elements of the code acquisition & tracking subsystem.

DETAILED DESCRIPTION OF THE INVENTION

Figure 5:
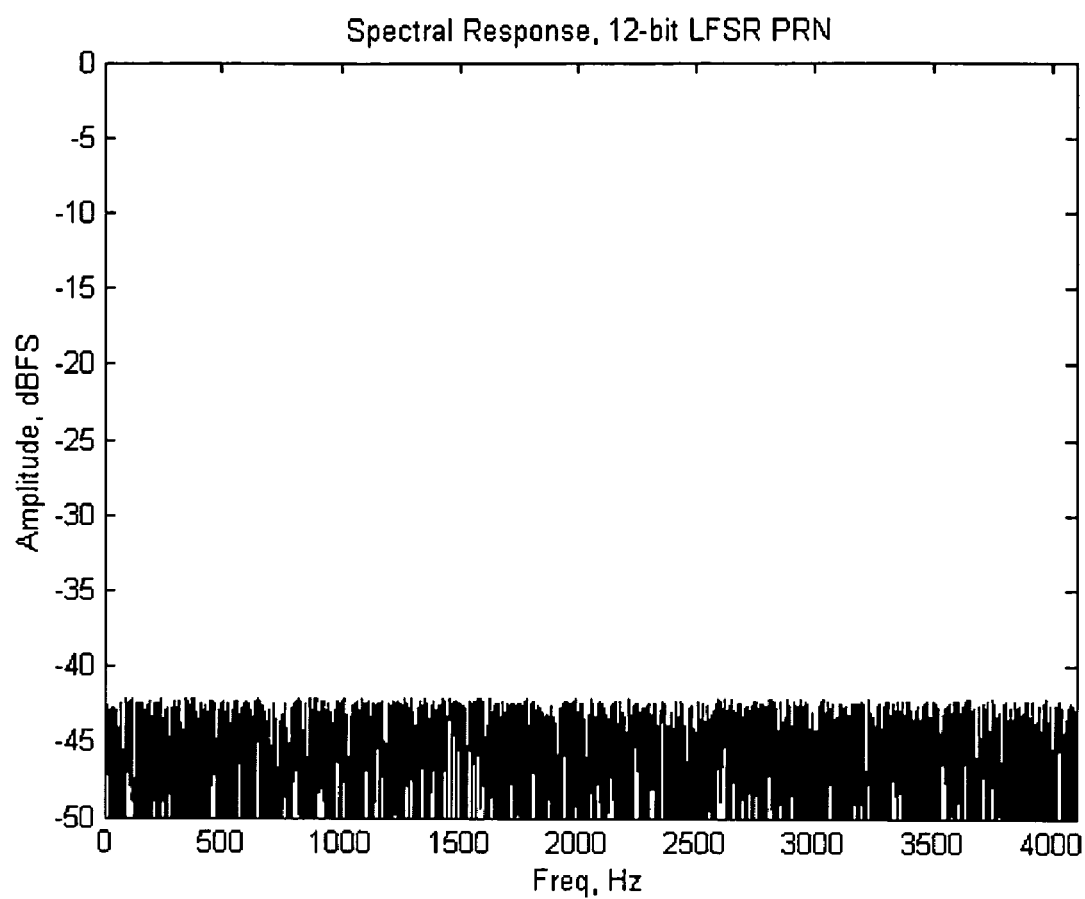
FIG. 5 represents a sample spectral plot of 4095 1-bit samples coming out of a 12-bit LFSR noise generator used in one embodiment of the present invention.

When an end-user listens to a signal such as a radio station, he adjusts his radio set to a number, for example 91.5, on the FM band. For the FM band, the 91.5 means 91.5 MHz, which is the frequency of the signal carrying the music (or "carrier" frequency).

Each radio station transmits its music or other content on a separate carrier frequency, such as 91.5 MHz, 91.7 MHz, or 96.3 MHz. The end-user selects a desired station by tuning the radio to receive a predetermined carrier frequency. The advantage of such a transmission system is its simplicity, which leads to very low cost products.

The disadvantage comes when you need to send a signal between multiple points, say between two soldiers in the field, in such a way that no one else can pick up the signal. If one soldier sent the signal at one frequency, 150 MHz, and the other soldier tuned his radio to the same 150 MHz, he would receive the signal. But, so would everyone else who tuned his or her radio to 150 MHz as well. This is the situation that spread spectrum was invented to solve.

The idea behind direct sequence spread spectrum is to take a signal that needs to be transmitted, to electronically take the power that normally would lie at a fixed frequency (i.e. 150 MHz), to divide the signal into many subdivisions, and to transmit each one at a different frequency at much lower power levels for each frequency. For a more detailed discussion of steganography, see U.S. Pat. No. 6,330,335, which patent is hereby incorporated by reference in its entirety.

The receiving device in this situation needs to know exactly how the signal was subdivided in the first place, so it can gather all the pieces from the various frequency bands and reconstruct the signal. Since an eavesdropper needs to know: (1) where all the pieces of the signal are placed after being subdivided; (2) exactly how to put them all back together correctly; and (3) have the technical competence to gather up all the signal subdivisions across wide frequency bands, it makes intercepting the signal(s) extremely difficult.

Since the subdivisions of the signal are all transmitted at much lower signal levels (volume) than the original signal, they can be easily hidden inside of another signal, such as a telephone conversation.

Any spread spectrum or other communication system consists of at least two parts: a transmitter and a receiver. The receiver portion can be implemented any number of ways; either within the phone system or outside of it; either by hardware equipment and minimal software, or by normal phone company hardware and lots of software.

The present invention will transmit a known set of data patterns onto the POTS phone line of an attached telephone, using direct sequence spread spectrum (DSSS). The resulting amplitude of the DSSS signal is low enough so as to be virtually imperceptible to either the originator or the recipient of the phone call.

As will be clear to one of ordinary skill in the art, the present invention has applications outside of 3-way call detection. Caller-ID, for example, identifies a phone line and not an individual phone, which is of limited utility considering the rapid proliferation of cell phones. This invention-if embedded in cell phones-could identify the phone identity as well as (w/caller ID) the phone number being used by it.

Furthermore, it can be used to send data over the phone lines as a person is talking, without their knowledge. For example, a modification of the present invention could be hooked to sensors for gas and electric meters. A consumer can simply place a call to the electric company; listen to a recording, and in the meantime, meter readings are sent right to the utility's computers, eliminating the need for meter readers.

In a preferred embodiment of the present invention as shown in FIG. 1, the block marked "Data ID Pattern" contains digital codes that the user of the present invention wishes to pass from a phone being monitored to another phone or system. Example codes include a serial number and a short digital string such as "XYZ Company, Model ABC, Serial No. 123456." These digital codes are preferably unique to the particular phone line and are stored in the invention in a non-volatile memory such as an EPROM, PROM or EEPROM. In the correctional institution context, an inmate is preferably required to enter a user ID or access code to gain access to the inmate telephone system. In that case, the embedded Data ID Pattern will preferably uniquely identify the inmate as the source of the original phone call. This can be accomplished either by generating an inmate specific code or by appending the user ID or other inmate specific code to the phone-line-unique code. As part of device operation, the patterns are sent to the "spread spectrum modulator" block to be encoded and transmitted across the phone line.

The receiver portion of the present invention preferably is installed on a restricted destination phone, such as a phone belonging to a judge, prosecutor, or victim. If an inmate-unique or a phone-line-unique Data ID Pattern is identified by the present invention in a call received at one of the above restricted destination phones, this will indicate that an inmate has placed a three-way call to that restricted phone in violation of institutional calling restrictions, or otherwise managed to bypass the phone restrictions of the inmate telephone system. Appropriate action, such as terminating or recording the phone call, can then be taken. An advantage of an inmate-unique identifier is that it permits calls to particular numbers to be restricted by individual inmate and allows the inmate originator of a restricted call to immediately be identified, and not just the originating phone line within the prison.

The block marked "random number generator" is an integral part of a spread spectrum system. Its purpose is to generate a random or pseudo-random number, referred to interchangeably as random numbers herein, to provide the order in which the pieces of the signal are subdivided or modulated and sent to the spread spectrum receiver. The more random the generator, the tougher it is to intercept, recover and reconstruct the transmitted signal at the receiver device. If the generator doesn't produce numbers that are very random, it will be relatively easy to intercept the transmitted signal (and data ID pattern), as well as easy to reconstruct the signal at the receiving device. Depending on the desired performance of the system, the randomness of the generator can be adjusted accordingly.

The block marked "spread spectrum modulator" is the method used to produce a modulated random signal containing the Data ID Pattern for transmission across the phone line. This invention preferably uses a BPSK modulator for its simplicity, low cost, and ease of use when transmitting digital data. Other modulators such as MPSK or QPSK can also be used.

The output from the BPSK modulator is applied to driver circuitry as shown in FIG. 1; such drivers also contain bandpass filtering. The modulated output resembles random-noise, and with the appropriate driver amplitude, can be driven onto a phone line with a level that is just barely perceptible, or even imperceptible, to most listeners.

Two possible implementations of the block marked "Phone Interface" on the block diagram are: (1) attaching the device to the handset of a telephone, and (2) attaching the device to the TIP/RING pair of a standard analog POTS (Plain Old Telephone System) line. In both implementations, the circuitry preferably is designed in such a way that the steganographic signal (spread spectrum-modulated Data ID Patterns or data) is passively added to the existing conversation on the line. For analog POTS phones, the steganographic signal preferably is transformer coupled onto the phone line. For digital phones, the digital values of the spread spectrum code preferably are added to the digital data representing a phone call. The analog circuit preferably uses a transformer to perform the passive adding function, while the digital circuit preferably uses a digital adder or a microcontroller running software that performs the add operation. Generally, it is not desirable for correctional institutions to modify the signals of conversations of its inmates. A recording of a conversation that has been manipulated may be excluded from use in a courtroom, and thus, for at least this reason, it is preferred that the steganographic signal is passively added to the phone lines so as to not jeopardize the integrity of the underlying conversation. Thus, this invention preferably uses transformer- or capacitive-coupling to passively add the steganographic signal to any existing conversations.

The block marked "Signal Interface" in FIG. 3 preferably consists of digital telecom circuitry comprising filtering, an Analog-to-Digital (A/D) converter (preferably implemented with a telecom codec), and other control circuitry to output digital data representing a received telephone signal. In modern, all-digital phone systems, the filtering and A/D converter just described aren't required, so the signal interface comprises just control circuitry, as in a T1 telecom interface.

The block marked "Data Demodulator" performs the function of extracting transmitted data from the spread spectrum signal and presenting it to the controlling correctional telephony system and computer(s). Decisions can be made by the controlling system, based on this received data, as to whether to continue or cancel the call, whether to start a recording device or not, or to take other appropriate actions.

The block marked "Code Acquisition & Tracking" is the most important, and most difficult, part of a spread spectrum receiver to implement. A typical Code Acquisition & Tracking function is shown in FIG. 4.

Refer back to FIG. 1 and notice the block marked Random Number Generator. Remember that this random number is key to spread spectrum modulation, or "spreading" of the transmitted signal across the transmission bandwidth. The same random number sequence is required in the receiver, and is shown in FIG. 4 marked as "Reference Spreading Code." The same sequence is used for both spreading and despreading.

The Reference Spreading Code function is shown with two variable parameters that affect the sequence being multiplied by the received signal—namely, Frequency and Phase. The Frequency parameter affects the rate of the random number generator's clock. This is required when oscillator instabilities and drift cause the clocks on the transmitter to differ slightly from those on the receiver. The Phase parameter affects the starting sequence loaded into the random number generator of the receiver or its sequence position compared to the same generator on the transmitter.

After being multiplied by the random number sequence and bandpass filtered, the received signal passes through an energy detector, which typically performs an envelope detection. The output of the envelope detection is compared to a threshold value and a "HIT" decision is made. If the detected output is above a pre-determined (or variable) threshold, a decision is made that the correct code acquisition sequence has been hit. Otherwise the HIT output is false.

If the code acquisition has not been hit (the HIT output is false), adjustments to the frequency and/or phase parameters may be made to help accelerate the likelihood of a hit occurring, or to decrease the time needed to detect the random number sequence phase whereby a hit occurs.

The bases for changing these parameters are well documented in the literature, and form a number of algorithms by which code acquisition can be made more robust and/or faster. Some examples of potential algorithms include: single search algorithms; single dwell and multiple dwell algorithms, and recursion-aided sequential estimation (RASE) algorithms. Each of these algorithms has its associated advantages and disadvantages, and thus, one may be preferred over others in any given situation depending on the characteristics of the processing circuitry available in the receiver, allowable cost of the receiver circuitry, and other factors.

The characteristics of the random number (RN) generator used in both the transmitter and the receiver play a significant role in the required performance of the spread spectrum receiver. RN generators are available which generate very long sequences before repeating, and others are available with very short sequences. If a single-search code acquisition algorithm is used, for example, all possible phase settings for a given RN sequence are correlated with the received signal in an attempt to get a hit. For long sequences, this can take a very long time or require tremendous amounts of circuitry. For short sequences, the task will be more reasonable.

Longer sequences provide more resistance to jamming, and provide less chance of having the signal intercepted and decoded. Shorter sequences provide less jamming protection and less security when intercepted, but also require less circuitry, leading to lower-cost products.

Besides simply the length of the RN sequence affecting its performance, the mathematical structure of the code affects its performance. Such sequences as Barker Codes, Gold codes and others are well documented in the literature.

In one preferred embodiment, a 12-tap Linear Feedback Shift Register (LFSR) is used as a pseudorandom noise (PRN) source, as is well known in the art. A LFSR design can be selected with an arbitrary number of bits, but the more bits used, the longer the random number sequence before it repeats and starts over again. Security systems and Government radios typically use LFSR sequences with 40, 50, or even 60 bit LFSR circuits so the random numbers don't repeat for hundreds of years—providing a good level of security in the radio link.

For the present invention, it is desirable for the PRN sequence to repeat to make the demodulation circuitry and software easier and more cost-effective. A 12-bit LFSR circuit generates a pseudorandom pattern that repeats every 4095 clock cycles. For example, with an 8 kHz clock rate, the pattern will repeat approximately every ½ second, allowing a 3-way call detection system to detect the call more than once every second.

FIG. 5 shows a spectral plot of the 4095 1-bit samples coming out of the 12-bit LFSR noise generator. The spectral shape is substantially flat. This gives the PRN signal a very good "white-noise" sound when added to a telephone conversation. This signal is almost undetectable when the amplitude levels are set correctly and added to phone conversations. Typical POTS phone systems have an approximately 40-45 dB dynamic range.

In summary, the spread spectrum receiver used with the present invention can be a standard DSSS receiver that implements any number of algorithms for its code-acquisition and tracking functions. The required demodulator is preferably a BPSK type, and the input signal is preferably digital, having been processed by telephony circuitry and passed through telephony codecs.

Figure 6:
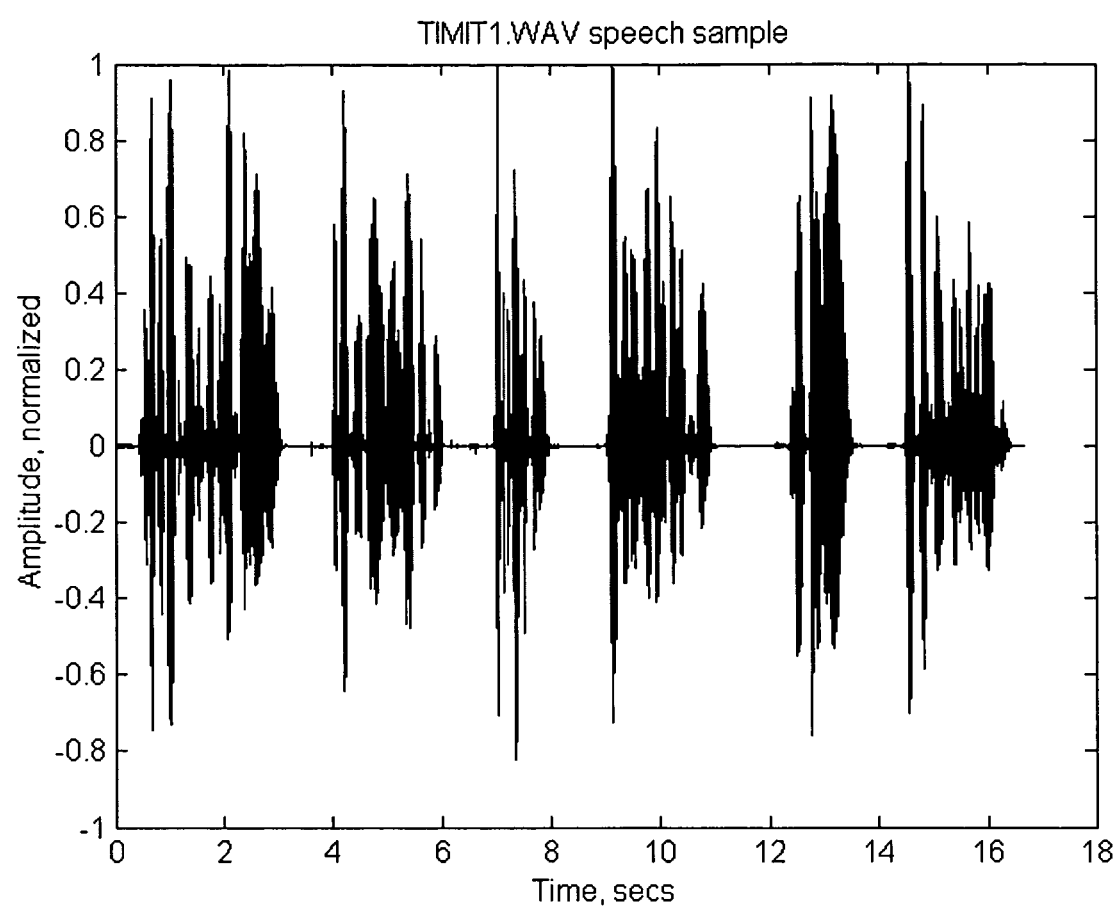
FIG. 6 represents a sample plot of a speech waveform used in testing of one embodiment of the present invention.
Figure 7:
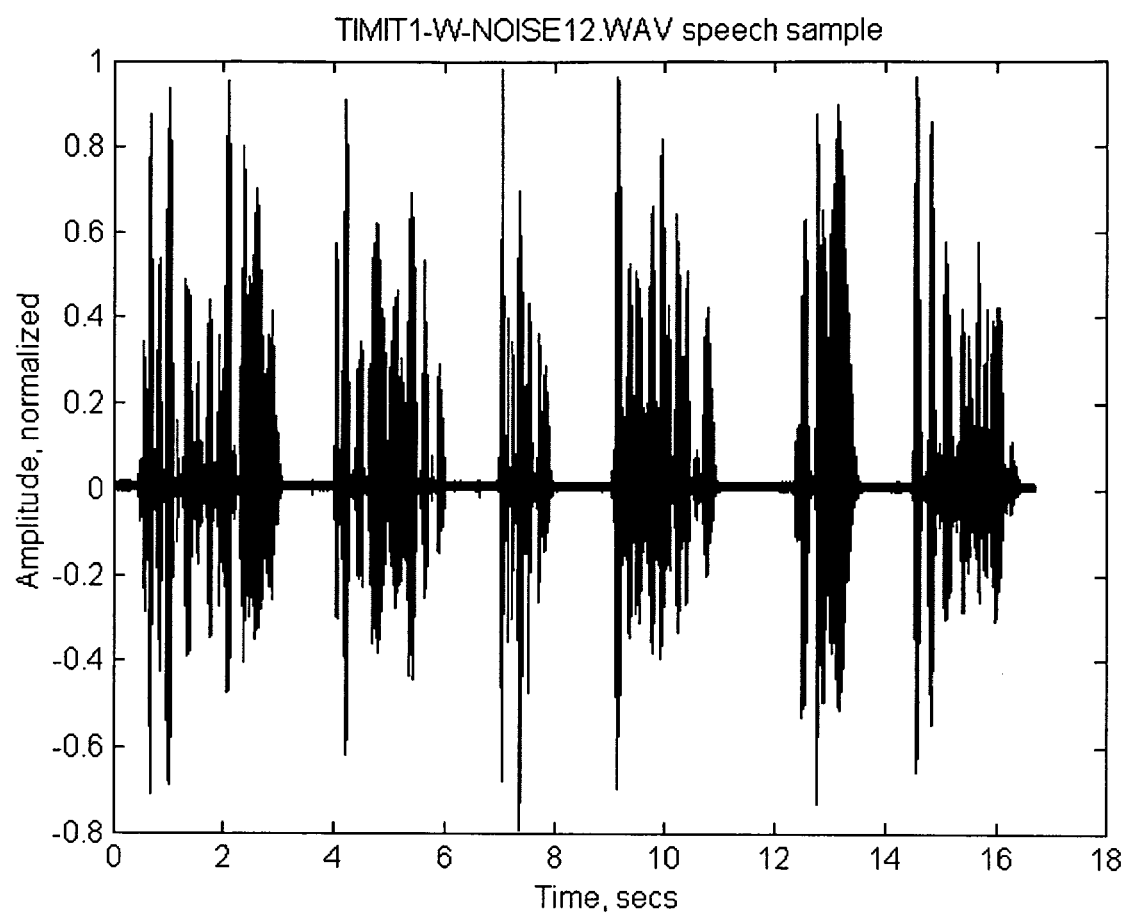
FIG. 7 represents a plot of the speech samples as in FIG. 6, but with the 12-bit LFSR noise sequence of FIG. 5 added to it.

A number of tests were conducted to validate the effectiveness of one embodiment of the present invention. The test system was equipped with handset and phone line interfaces and utilized a microcontroller programmed with detection software that is designed to run continuously and output a digital bit (one or zero) every 125 μsec (which equates to an 8 kHz output rate). Each digital bit is output as the result of a Pseudo-Random Noise Generator ("PRN generator"), implemented in software. The PRN consisted of a single data register (implemented as a software variable)

with feedback. The timing of the software is important, as the calculations on the PRN register must be completed in time for a valid bit to be output at the desired interval, which was 125 μsec for the test embodiment. Timing can be verified by using an oscilloscope to monitor a debug pin on the microcontroller, which is toggled every 125 μsec. The microcontroller used for the foregoing tests had internal RAM for variables, FLASH for storing the program, I/O pins for toggling the required signals, and an internal timer for measuring the 125 μsec period. MATLAB was used for the DSP and signal processing portion of the system design. Segments of speech from the industry standard "TIMIT" speech database were used for testing. TIMIT is a collection of carefully chosen speech utterances that have special phonetic qualities that stress speech recognition systems and is widely used for speech research. The database comprises 10 spoken sentences for each of 420 speakers, some male and some female. FIG. 6 shows a plot of the speech waveform used in this testing. FIG. 7 shows a plot of the speech samples as in FIG. 6, but with the 12-bit LFSR noise sequence added to it.

Figure 8:
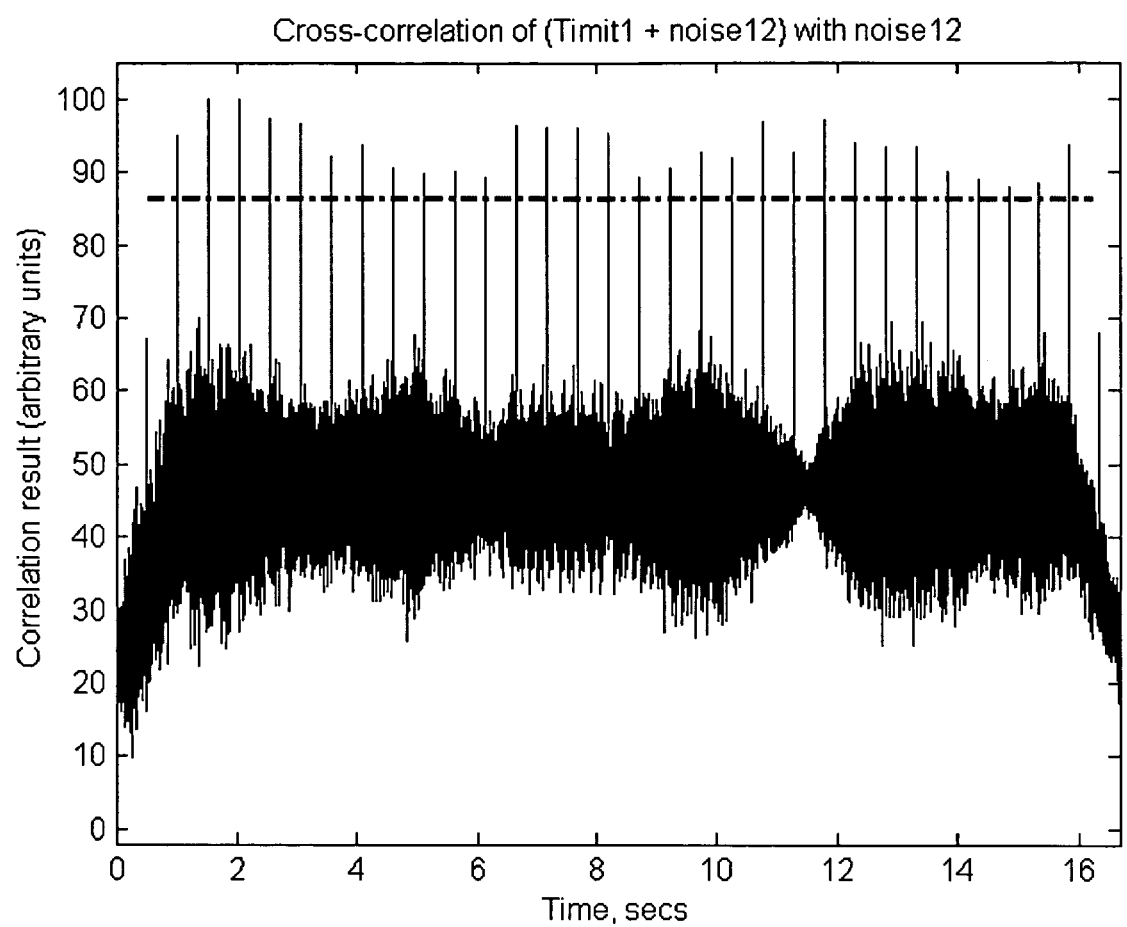
FIG. 8 represents a sample plot of the results of correlating the 4095 sample PRN sequence of FIG. 5 with the signal+noise waveform of FIG. 7 and the PRN sequence itself.
Figure 11:
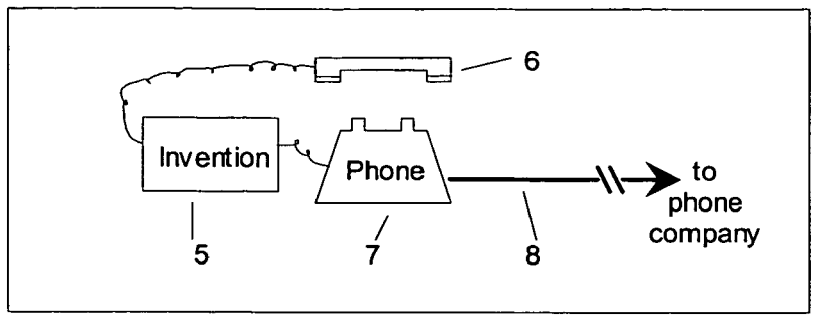

FIG. 8 shows the results of correlating the 4095 sample PRN sequence with the signal+noise waveform and the PRN sequence itself. Each of the vertical "spikes" in FIG. 11 represents a point in time (during exactly ONE sample period of the 8 kHz clock) where the PRN noise sequence of the present invention and the noise in the signal are in perfect phase, causing the correlation output to jump up to a maximum value. Each of the spikes occur 4095 samples apart, because that is the repetition interval of the LFSR noise generator in the tested embodiment. The dashed line on FIG. 8 is an example threshold that is preferably set in the system software portion of the demodulator to indicate when a three-way call has been detected.

Figure 9:
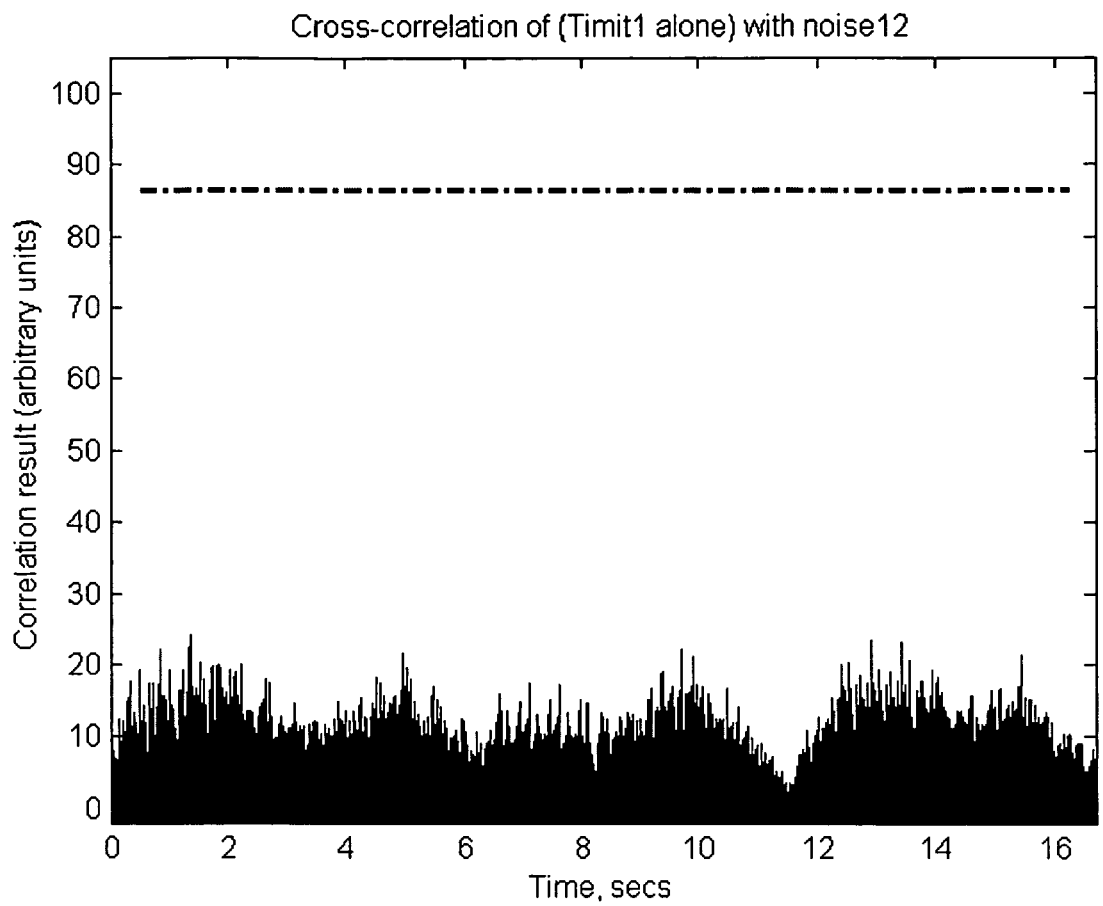
FIG. 9 represents a sample plot of the results of a correlation between the clean speech signal of FIG. 6 and the PRN sequence of FIG. 5.

FIG. 9 shows the results of a correlation between the clean speech signal and the PRN sequence. FIG. 9 maintains the same relative scaling as FIG. 8. Because the speech waveforms are not well correlated to the PRN noise sequence, the correlation peaks of FIG. 9 have a significantly lower magnitude than those of FIG. 8. In the absence of the PRN signal, as would be the case when there is no three-way call taking place, even the correlation peaks do not exceed the detection threshold.

Figure 10:
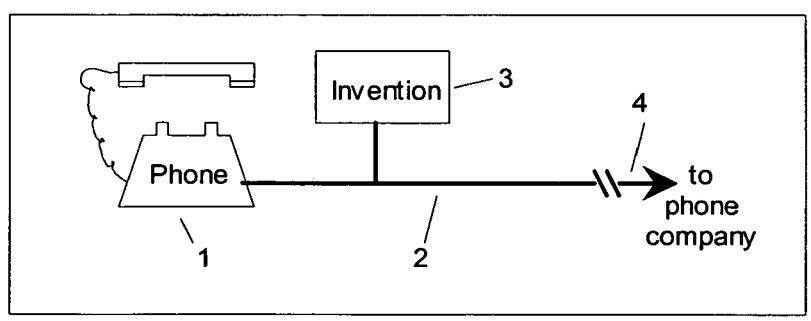
FIGS. 10-13 illustrate four possible operating modes for the present invention: (1) on a typical wired telephone, attached to an analog POTS phone line as shown in FIG. 10 and FIG. 13; (2) between a telephone and its handset as shown in FIG. 11; (3) with an external microphone and a cellular phone as shown in FIG. 12; and (4) attached to an analog POTS phone line with multiple wired telephones as shown in FIG. 13.

FIG. 10 shows the invention used with a typical POTS (plain old telephone system) analog telephone. Telephone 1 is connected to the incoming phone line 4 by means of a standard 2-wire or 4-wire phone cable 2. Invention 3 is also connected to the incoming phone line by means of a similar cable. Circuitry within invention 3 allows it to generate a signal that also gets driven onto the phone line 4 along with the signal from the telephone 1. The scenario shown in FIG. 10 can also be used with cordless (but not wireless cellular) phones. Attaching invention 3 to the phone line 2 can be done with a cordless phone 1 as well as with a standard old-style (handset attached to the base) telephone.

An alternative scenario is shown in FIG. 11 where the invention 5 is connected between the phone 7 and its handset 6. This scenario can be used for single-phone installations where only a single phone needs the invention and not all the phones on a POTS line as shown in FIG. 11. This scenario also has advantages in physical size and not requiring FCC compliance, which can help reduce its development and production costs.

Figure 12:
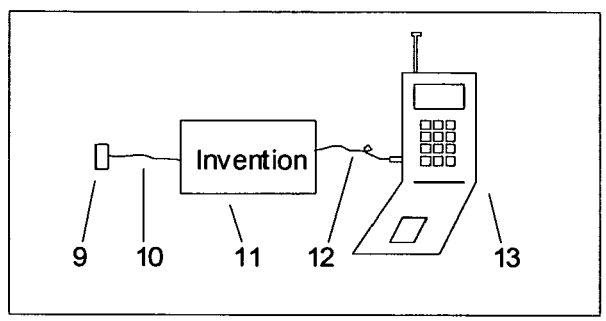

The invention can also be used with wireless (cellular) phones, as shown in FIG. 12. Invention 11 is attached to a microphone 9 by means of a microphone cable 10, as well as to the cell phone 13 by means of another cable 12. Invention 11 receives the signal from the microphone 9 as the user speaks, adds the steganographic signal to the microphone signal, and then drives the resulting signal into cell phone 13 for transmission.

Figure 13:
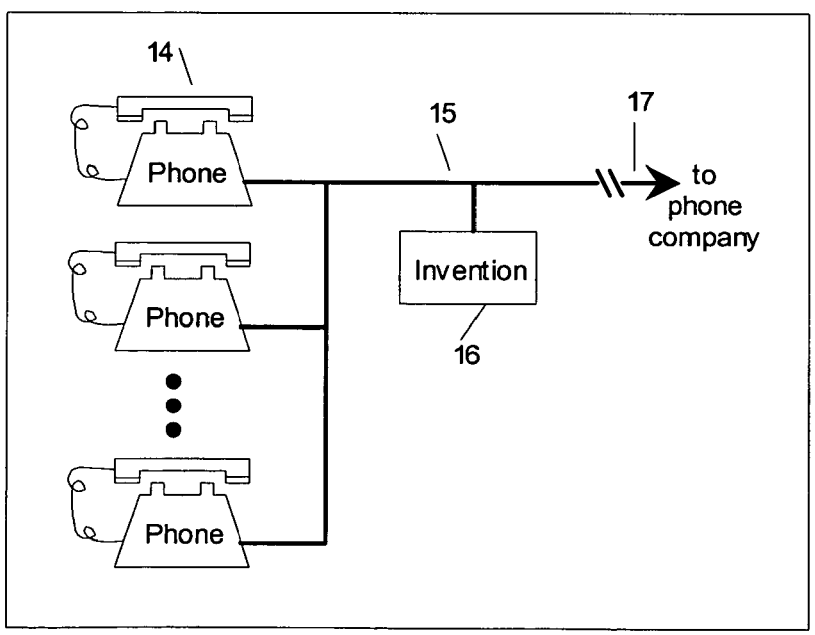

FIG. 13 shows a scenario similar to FIG. 11, but for a multiple-phone installation such as in a home or business. Invention 16 generates the steganographic signal and drives it onto the phone line 15 along with the signal from one or more phones 14 for transfer to the POTS line 17.

Other embodiments and uses of the invention will be apparent to those skilled in the art from consideration of the specification and practice of the invention disclosed herein. The specification and examples should be considered exemplary only with the true scope and spirit of the invention indicated by the following claims. As will be understood by those of ordinary skill in the art, variations and modifications of each of the disclosed embodiments can be easily made within the scope of this invention as defined by the following claims.

What is claimed is:

1. A three way call detection system for detecting the addition of a third party to an pre-existing telephonic connection between a first party and a second party, said system comprising:

an ID generator for generating identification data;
a spread spectrum modulator for imposing the identification data onto a carrier signal, said modulator outputting a modulated identification signal having frequency components that are capable of being transmitted via a telephonic connection;
a source telephone for participating in a telephone conversation;
a signal combiner for adding the modulated identification signal to the telephone conversation to form an encoded telephone signal, the modulated identification signal being imperceptible to a human listener of the telephone conversation;
a remote telephone for receiving the encoded telephone signal; and
a spread spectrum demodulator for demodulating the modulated identification signal to extract the identification data.

2. The system of claim 1 wherein the identification data is selected from the following: a personal identification number, a user number, an inmate identification number, a user name, data identifying the local telephone exchange of the source telephone, a telephone number of the source telephone, and data identifying the institution where the source telephone is located.

3. The system of claim 1 further comprising a processor for extracting the modulated identification signal from the encoded telephone signal.

4. The system of claim 1 wherein the spread spectrum modulator imposes the identification data onto a carrier signal by subdividing the identification data into a plurality of subdivisions and encoding the plurality of subdivisions on a plurality of frequency bands using a predetermined sequence.

5. The system of claim 4 wherein the spread spectrum demodulator demodulates the modulated identification signal, extracts the plurality of subdivisions of the identification data and assembles the plurality of subdivisions of the identification data into the identification data using the predetermined sequence.

6. The system of claim 4 wherein the predetermined sequence is a predetermined pseudo-random code.

7. The system of claim 4, further comprising a code generator for generating a pseudo-random code, and wherein the predetermined sequence is a pseudo-random code generated by the code generator.

8. The system of claim 7 wherein the signal combiner passively adds the pseudo-random code to the telephone conversation at a predetermined plurality of frequencies.

9. A system for identifying a source telephone, said source telephone having identification data associated therewith, the system comprising:
a spread spectrum modulator for encoding the identification data into a spread spectrum signal using a spreading code; and
a telephone interface for coupling to a telephone to add the spread spectrum signal to an output of the telephone.

10. The system of claim 9 further comprising a processor for coupling to a telephone to extract identification data using a spread spectrum demodulator and a spreading code.

11. The system of claim 9 wherein the spread spectrum modulator is a selected one of a BPSK modulator, an MPSK modulator, and a QPSK modulator.

12. The system of claim 9 wherein the telephone interface is coupled to a selected one of a telephone handset, a TIP/RING pair of a standard analog POTS line, and a digital telephone interface.

13. The system of claim 9 wherein the telephone interface passively adds the spread spectrum signal to a telephone signal by a selected one of transformer coupling and capacitive coupling.

14. The system of claim 13, further comprising a processor, coupled to the receiver, for extracting the modulated identification signal from the telephone signal.

15. The system of claim 13, further comprising:
a comparator for comparing the identification data to a predetermined set of restricted data; and
a restricted call response module for executing at least a selected one of the following responses if the identification data matches any of the predetermined set of restricted data: (1) turning off a microphone of a telephone, (2) disconnecting a telephone call, (3) recording any conversation that may occur on a call, (4) playing a prerecorded message, (5) recording call data, (6) disabling the speaker of a telephone, and (7) adding a disruptive signal to a telephonic connection.

16. The system of claim 13, further comprising:
a code generator for generating a pseudo-random code;
a spread spectrum modulator for imposing the identification data onto a carrier signal using the pseudo-random code, said modulator outputting a modulated identification signal having frequency components that are capable of being transmitted via a telephonic connection; and
a signal combiner for adding the modulated identification signal to an audio signal of a telephone microphone, said combiner producing a telephone signal as an output.

17. A system for decoding a modulated identification signal imbedded in a telephone signal wherein the identification signal is capable of identifying a source of the identification signal, the system comprising:
a receiver for receiving a telephone signal, which telephone signal comprises an audio signal and a modulated identification signal, said modulated identification signal having identification data embedded therein; and
a spread spectrum demodulator for demodulating the modulated identification signal to extract the identification data.

18. A method for identifying a source telephone, the method comprising:
providing a data identification pattern for identifying a source telephone;
generating a reference spreading code using a random number generator;
encoding the data identification pattern into an identification signal using the spreading code and a spread spectrum modulator, thereby generating a modulated identification signal;
combining the modulated identification signal with an audio signal of a microphone output of a telephone to form a composite telephone signal, the modulated identification signal being imperceptible to a human listener of the composite telephone signal; and
transmitting the composite telephone signal across a telephonic connection.

19. The method of claim 18, further comprising:
receiving the composite telephone signal from a source telephone at a remote location; multiplying the composite telephone signal by the reference spreading code to form a signal product;
filtering or correlating the signal product to extract the modulated identification signal from the digital data; and
comparing the modulated identification signal with a predetermined set of restricted data signals to determine if the modulated identification signal matches at least one of a predetermined set of restricted data signals.

20. The method of claim 19 further comprising:
performing an envelope detection on the filtered signal product, if needed; and
comparing the output of the envelope detection with a threshold value to determine if the signal product matches at least one of a predetermined set of restricted data signals.

21. The method of claim 19 further comprising:
initiating a restricted call response if the signal product matches at least one of a predetermined set of restricted data signals, the restricted call response being selected from the group of following choices: (1) turning off a microphone of a telephone, (2) disconnecting a telephone call, (3) recording a call, (4) playing a prerecorded message, (5) recording call data, (6) disabling the speaker of a telephone, and (7) adding a disruptive signal to a telephonic connection.

22. The method of claim 19 wherein the step of receiving the composite telephone signal further comprises:
providing an analog-to-digital converter; and
converting the composite telephone signal from an analog signal to a digital signal.

23. The method of claim 18 further comprising:
demodulating the modulated identification signal to extract the data identification pattern using a reference spreading code.

24. A method for identifying a source of a telephone signal received by a remote telephone, the method comprising:
receiving a composite telephone signal from a source telephone at a remote location, the composite telephone signal comprising an audio signal representative of a telephone conversation and a modulated identification signal, the modulated identification signal having identification data that was embedded therein using a reference spreading code;
extracting the modulated identification signal; and
analyzing the extracted modulated identification signal to determine if the identification signal contains data that matches at least one of a predetermined set of restricted data signals.

25. The method of claim 24 wherein the step of extracting the modulated identification signal further comprises:
multiplying the composite telephone signal by the reference spreading code to form a signal product; and
extracting the modulated identification signal.

26. The method of claim 25 further comprising:

initiating a restricted call response if the signal product matches at least one of a predetermined set of restricted data signals, the restricted call response being selected from the group of following choices: (1) turning off a microphone of a telephone, (2) disconnecting a telephone call, (3) recording a call, (4) playing a prerecorded message, (5) recording call data, (6) disabling the speaker of a telephone, and (7) adding a disruptive signal to a telephonic connection.

27. The method of claim 24 wherein the step of receiving the composite telephone signal further comprises:

providing an analog-to-digital converter; and converting the composite telephone signal from an analog signal to a digital signal.

28. The method of claim 24 further comprising:

demodulating the modulated identification signal to extract the identification data using a reference spreading code.

29. A three way call detection system for detecting the addition of a third party having a third phone to an pre-existing telephonic connection between a first party having a first phone and a second party having a second phone, said system comprising:

an ID generator for generating identification data;

a spread spectrum modulator for imposing the identification data onto a carrier signal, said modulator outputting an identification signal having frequency components that are capable of being transmitted via a telephonic connection;

a signal combiner for adding the identification signal to an output from a microphone of the first phone, thereby producing a combined output signal, said identification signal being added at a level that is imperceptible to a human ear that hears the combined output signal;

a signal receiver coupled to a third phone, for receiving the combined output signal after transmission across a telephonic connection from the first phone to the third phone;

a spread spectrum demodulator for demodulating the identification signal to extract the identification data; and a processor to analyze the identification data.

30. The system of claim 29 wherein the output from the microphone comprises a digital signal and the signal combiner comprises a selected one of a digital adder or a microcontroller that digitally adds the identification signal to the output from the microphone.

31. The system of claim 29 wherein the output from the microphone comprises an analog signal and the signal combiner comprises a transformer for coupling the identification signal to the output from the microphone.

32. The system of claim 29 further comprising a digital signal processor coupled to the signal receiver for extracting the identification signal from the combined output signal.

33. The system of claim 29 wherein the processor analyzes the identification data to determine whether the connection is authorized.

34. The system of claim 29 wherein the third phone is a component of a local telephone system, and wherein the processor analyzes the identification data and reports its analysis to the local telephone system.

35. The system of claim 29 wherein the combined output signal travels a telephonic connection between the first phone to the second phone, and travels a telephonic connection between the second phone and the third phone.

36. A detection system for detecting a telephonic connection between a first phone and a second phone, said system comprising:

an ID generator for generating identification data;

a spread spectrum modulator for imposing the identification data onto a carrier signal, said modulator outputting an identification signal having frequency components that are capable of being transmitted via a telephonic connection;

a signal combiner for adding the identification signal to an output from a microphone of a first phone, thereby producing a combined output signal, said identification signal being added at a level that is imperceptible to a human ear that hears the combined output signal;

a signal receiver for receiving the combined output signal after transmission across a telephonic connection;

a spread spectrum demodulator for demodulating the identification signal to extract the identification data; and a processor to analyze the identification data.

37. The system of claim 36 further comprising a digital signal processor coupled to the signal receiver for extracting the identification signal from the combined output signal.

38. The system of claim 36 wherein the first phone is a restricted phone, and the processor determines whether the connection between the restricted phone and the second phone is unauthorized.

39. The system of claim 38 wherein the processor is coupled to the second phone, and upon the detection of an unauthorized connection, the processor causes one or more of the following actions to occur:

a) recording a conversation between the restricted phone and the second phone;

b) terminating the connection between the restricted phone and the second phone;

c) disabling a speaker of the second phone;

d) adding an audible disruptive signal to the telephonic connection; and e) adding an audible warning message to the telephonic connection.

40. The system of claim 36 wherein the second phone is a restricted phone, and the processor determines whether the connection between the first phone and the restricted phone is unauthorized.

41. The system of claim 40 wherein the processor is coupled to the second phone, and upon the detection of an unauthorized connection, the processor causes one or more of the following actions to occur:

a) recording a conversation between the restricted phone and the second phone;

b) terminating the connection between the restricted phone and the second phone;

c) turning off a microphone of the restricted phone;

d) adding an audible disruptive signal to the telephonic connection; and e) adding an audible warning message to the telephonic connection.

42. The system of claim 36 wherein the signal receiver is coupled to a third phone that is a component of a local telephone system, and wherein the processor analyzes the identification data and reports its analysis to the local telephone system.

* * * * *